US008785521B2

(12) United States Patent
Miller et al.

(10) Patent No.: US 8,785,521 B2
(45) Date of Patent: Jul. 22, 2014

(54) TWO-PARTICLE NANOCOMPOSITE DIELECTRICS

(75) Inventors: Seth Adrian Miller, Englewood, CO (US); Gary Lynn Duerksen, Ward, CO (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/143,726

(22) PCT Filed: Mar. 29, 2011

(86) PCT No.: PCT/US2011/030342
§ 371 (c)(1),
(2), (4) Date: Jul. 7, 2011

(87) PCT Pub. No.: WO2012/134452
PCT Pub. Date: Oct. 4, 2012

(65) Prior Publication Data
US 2013/0201605 A1    Aug. 8, 2013

(51) Int. Cl.
*C08K 9/00*    (2006.01)
(52) U.S. Cl.
USPC .......................................... 523/210; 523/220
(58) Field of Classification Search
USPC ................................................ 523/220, 210
See application file for complete search history.

(56) References Cited

U.S. PATENT DOCUMENTS

| 7,718,950 | B2 | 5/2010 | Saraf |
| 7,759,715 | B2 | 7/2010 | Bhattacharyya |
| 2003/0174994 | A1 | 9/2003 | Garito et al. |
| 2007/0060672 | A1* | 3/2007 | Kumashiro et al. ........... 523/220 |

OTHER PUBLICATIONS

S.L. Jianga et al., Novel Ag—BaTiO3/PVDF three-component nanocomposites with high energy density and the influence of nano-Ag on the dielectric properties; Department of Electronic Science and Technology, Huazhong University of Science and Technology, 1037 Luoyu Road, Wuhan 430074, China Received Jun. 5, 2008; revised Aug. 26, 2008; accepted Sep. 29, 2008. Available online Oct. 15, 2008.
J.Y. Li et al., Electric energy density of dielectric nanocomposites, Applied Physics Letters 90, 132901, 2007.
Philseok Kim et al., High Energy Density Nanocomposites Based on Surface—Modified $BaTiO_3$ and a Ferroelectric Polymer, Nano, 3(9), 2009, 2581-2592.
Roy, M. et al, Polymer nanocomposite dielectrics-the role of the interface, Dielectrics and Electrical Insulation, IEEE Transactions on, 12 (4), 2005, 629-643.
Smith, R.C. et al., The mechanisms leading to the useful electrical properties of polymer nano dielectrics, Dielectrics and Electrical Insulation, IEEE Transactions on, 15(1), 2008, 187-196.
PCT/US11/30342 International Search Report and Written Opinion mailed Jun. 1, 2011.
Kota, K.R., "Dielectric Properties and Method of Characterizing Ceramic Powders and Multiphase Composites," A Thesis Presented to the Graduate School of Clemson University, Dec. 2006, pp. 1-80.
PCT/US2011/030342 International Preliminary Report on Patentability, mailed Oct. 10, 2013.

* cited by examiner

*Primary Examiner* — Edward Cain
(74) *Attorney, Agent, or Firm* — Turk IP Law, LLC

(57) ABSTRACT

Technologies are generally described for a nanocomposite polymer dielectric that may incorporate two types of nanoparticles and a polymer. One of the two types of nanoparticle may be a first, smaller nanoparticle, that may occupy spaces between larger second nanoparticles. Another of the two types of nanoparticle may be the second, larger, "high-κ" nanoparticle, which supports the overall dielectric constant of the material. In an applied electric field, the first, smaller nanoparticle may redistribute local charge to homogenize electric fields in the dielectric material, tending to avoid the development of "hot spots". Such a two-nanoparticle nanocomposite dielectric material may provide increased dielectric breakdown strength and voltage endurance in comparison with a nanoparticle dielectric which only contains a single type of "high-κ" nanoparticle.

41 Claims, 8 Drawing Sheets

TWO-PARTICLE NANOCOMPOSITE DIELECTRICS

This application claims the benefit of International Patent Application Serial No. PCT/US2011/030342 filed on Mar. 29, 2011. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

Dielectric materials are commonly used in energy storage devices, e.g., to separate opposing electrodes in an electrostatic capacitor. Nanocomposite dielectric materials include inorganic nanoparticles in a polymer base, which together have relatively high dielectric constants due in part to the inorganic nanoparticles while retaining much of the processibility advantages of the base polymer. For energy storage applications, such as electrostatic capacitors, a high breakdown strength and good endurance may be desirable so that large charge densities may be tolerated over the device life.

The present disclosure appreciates that there are several limitations with known nanocomposite dielectrics. For example, nanocomposite dielectrics have been described as having less than desirable breakdown strength, since it is believed that the presence of high permittivity nanoparticles may lead to highly inhomogenous internal electric fields, creating local hot spots inside the composite where the actual fields may be much higher than the applied field. The hot spots may lead to breakdown of the nanocomposite dielectric, limiting performance and lifetime. Thus, implementing dielectric materials with desirable properties, particularly nanocomposite dielectric materials for use in in energy storage devices, can be a complex undertaking.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes compositions for nanocomposite dielectrics. An example dielectric material may include a polymer, and a distribution of first nanoparticles, where the first nanoparticles have a first average diameter and the first nanoparticles may include one of a semiconductor or insulator. The example dielectric material may also include a distribution of second nanoparticles that has a second average diameter that is larger than the first average diameter, where the second nanoparticles may have a bulk dielectric constant $\kappa$ greater than about 10.

The present disclosure also describes capacitors employing nanocomposite dielectrics. In other examples, a capacitor may include a first electrode, a second electrode, and a dielectric material that separates the first and second electrodes. The dielectric material may include a polymer, and a distribution of first nanoparticles, the first nanoparticles having a first average diameter, where the first nanoparticles may include one of a semiconductor or insulator. The dielectric material in the capacitor may also include a distribution of second nanoparticles that has a second average diameter that is larger than the first average diameter, and the second nanoparticles may have a bulk dielectric constant $\kappa$ greater than about 10.

The present disclosure further describes methods for making the nanocomposite materials. In further examples, a method of making a dielectric material may include a step of contacting a distribution of first nanoparticles with a polymer, the first nanoparticles having a first average diameter, where the first nanoparticles may include one of a semiconductor or insulator. The method of making the dielectric material may also include contacting the polymer to a distribution of second nanoparticles that has a second average diameter that is larger than the first average diameter, and the second nanoparticles may have a bulk dielectric constant $\kappa$ greater than about 10.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
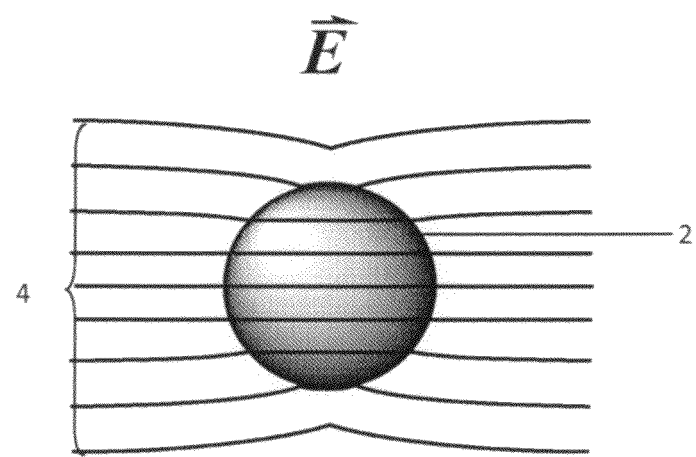
FIG. 1 illustrates internal electric field lines that may manifest under an applied external field E in the case of an ideal particle having a higher dielectric constant $\kappa$ than the surrounding medium.

all arranged in accordance with at least some embodiments as described herein.

DETAILED DESCRIPTION

In the following detailed description, reference is made to the accompanying drawings, which form a part hereof. In the drawings, similar symbols may identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to manufacturing or using nanocomposite dielectric materials, for example as part of an energy storage device such as a capacitor.

Briefly stated, the present disclosure generally describes a nanocomposite polymer dielectric that may incorporate two types of nanoparticles and a polymer. One of the two types of nanoparticle may be a first, smaller nanoparticle, that may occupy spaces between larger second nanoparticles. Another of the two types of nanoparticle may be the second, larger, "high-κ" nanoparticle, which may support the overall dielectric constant of the material. In an applied electric field, the first, smaller nanoparticle may redistribute local charge to homogenize electric fields in the dielectric material, tending to avoid the development of "hot spots". Such a two-nanoparticle nanocomposite dielectric material may provide increased dielectric breakdown strength and voltage endurance in comparison with a nanoparticle dielectric which only contains a single type of "high-κ" nanoparticle.

FIG. 1 illustrates internal electric field lines that may manifest under an applied external field E in the case of an ideal particle having a higher dielectric constant κ than the surrounding medium, in accordance with at least some embodiments described herein. As illustrated in FIG. 1, ideal particle 2 may have a higher dielectric constant κ than the surrounding medium 4. According to this difference in dielectric constants κ, the electric field lines may tend to concentrate at particle 2 compared to medium 4.

Figure 2:
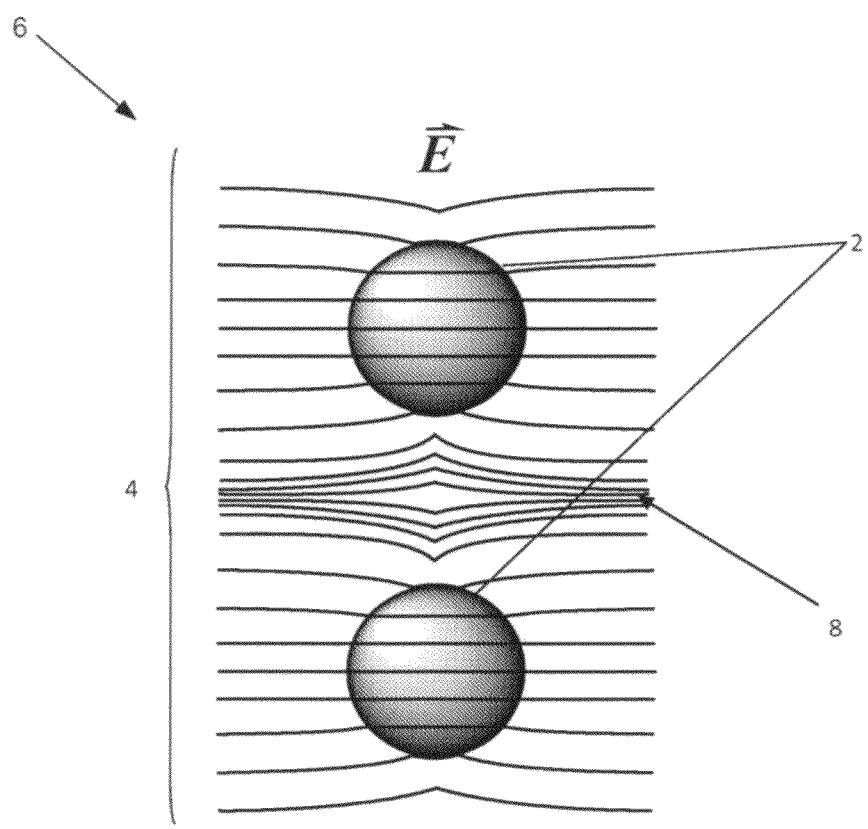
FIG. 2 is a stylized illustration of the situation in a nanocomposite dielectric, which may have a single type of high-$\kappa$ particle in a polymer which may have a lower $\kappa$.

FIG. 2 is a stylized illustration of the situation of a nanocomposite dielectric design with a single type of high-κ particle in a polymer which has a lower κ. FIG. 2 illustrates a nanocomposite dielectric material 6 with a single type of high-κ particles 2, embedded in a polymer medium 4 which may have a lower κ than that of high-κ particles 2. The location of multiple high-κ particles 2 in close proximity may lead to inhomogenous electric fields, as illustrated by the converging electric field lines in FIG. 2. While FIG. 2 shows only two high-κ particles 2 for brevity, the situation may become more complex in the presence of additional high-κ particles 2, which may increase the likelihood of highly inhomogenous electric fields. Such field inhomogeneities may lead to regions of higher electrical fields or "hot spots" 8, where the polymer medium 4 may break down, leading to breakdown of the overall dielectric material 6.

Figure 3:
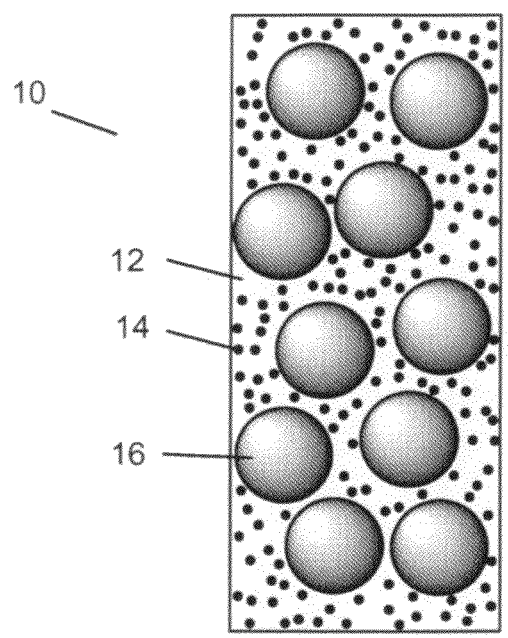
FIG. 3 illustrates an example dielectric material disclosed herein, which may include a distribution of first nanoparticles with a first average diameter and a distribution of second nanoparticles with a second average diameter that is larger than the first average diameter of the first nanoparticles.

FIG. 3 illustrates an example dielectric material disclosed herein, which may include a distribution of first nanoparticles with a first average diameter and a distribution of second nanoparticles with a second average diameter that is larger than the first average diameter of the first nanoparticles, in accordance with at least some embodiments described herein. FIG. 3 illustrates the approach described herein to the challenge of FIG. 2. In FIG. 3, an example dielectric material 10 may include a polymer 12, and a distribution of first nanoparticles 14, where the first nanoparticles 14 may include one of a semiconductor or insulator. The example dielectric material 10 may also include a distribution of second nanoparticles 16. The second average diameter of second nanoparticles 16 may be larger than the first average diameter of first nanoparticles 14. Also, the second nanoparticles 16 may have a bulk dielectric constant κ greater than about 10. As used herein, dielectric constant κ means the relative static electric permittivity of a material at zero frequency, compared to that of vacuum: $\kappa = \epsilon(0)/\epsilon_0$ (where $\epsilon_0$ represents the electric constant of a vacuum). As used herein, "high-κ" materials have a κ of 10 or higher, e.g., silicon (κ=11.68), hafnium oxide (κ=25), titanium dioxide (κ=86 to 173), strontium titanate (κ=310), barium strontium titanate (κ=500), barium titanate (κ=1,250 to 10,000), and lead zirconate titanate (κ=500 to 6000).

First nanoparticles 14 may be selected with an average diameter (i.e. a first average diameter) that is smaller than an average diameter (i.e., a second average diameter) of the second nanoparticles 16. In various examples, the second average diameter of the distribution of second nanoparticles 16 may be between about 2 to about 100 times larger than the first average diameter of the distribution of first nanoparticles 14.

The smaller diameter first nanoparticles 14 may dissipate local charge build-up and/or homogenize the internal electric field in dielectric material 10, and thus may reduce the tendency of hot-spot formation (such as "hot spot" 8 in FIG. 2). Smaller diameter first nanoparticles 14 may be low-κ, and may even be chosen to have a lower κ than polymer 12, as long as first nanoparticles 14 tend to be effective at improving breakdown strength and endurance in dielectric material 10. An example material for first nanoparticles 14 is $SiO_2$, which may be advantageous in that it tends to be cost-effective and easy to work with, and has been previously reported to improve charge stability even though it is conventionally thought of as a non-polarizable material.

Figure 4:
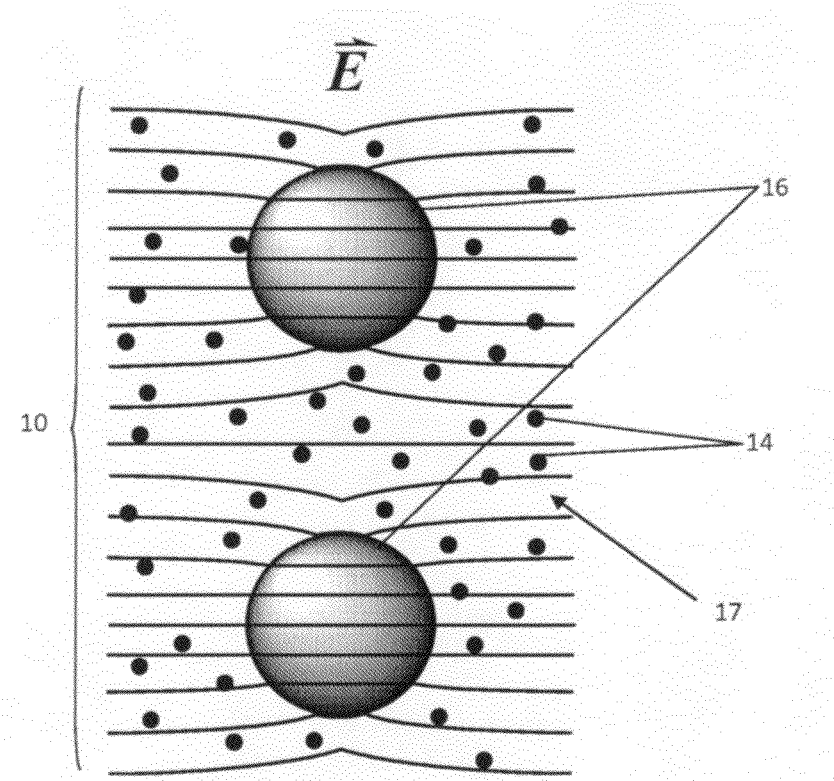
FIG. 4 is a stylized illustration of the effect the smaller, first nanoparticles may have on the internal electric fields.

FIG. 4 is a stylized illustration of the effect of smaller first nanoparticles on internal electric fields, in accordance with at least some embodiments described herein. In FIG. 4, the smaller diameter first nanoparticles 14 in dielectric material 10 are depicted according to the effect they may have on the internal electric fields. In contrast to dielectric materials with a single type of particle (e.g., as described in FIG. 2 for nanocomposite dielectric material design 6), the smaller, first nanoparticles 14 in FIG. 4 may dissipate charge and homogenize the electric field in dielectric material 10, which may reduce electric field inhomogeneities and the formation of hot spots, e.g., at region 17 (contrast, for example, with hot spot 8 in FIG. 2).

The effect of the smaller diameter first nanoparticles 14 in dielectric material 10 may occur along the following lines. A small loading of silica nanoparticles (κ=3.9) may increase the voltage endurance of a base polymer. The nanoparticles may be utilized to suppress electrical breakdown by homogenizing the field intensities that arise due to local field fluctuations. As long as the field intensities stay below a critical point to initiate "treeing" (catastrophic breakdown by a cascade of electrons at high energies), the endurance of the material may be preserved. Enhanced local conductivity may occur around each nanoparticle, providing a mechanism for redistributing charge around the particle. Nanocomposites are rich in surface states which may contribute to the reductions in mobility and carrier energy. Therefore, the opportunity for contribution to localized destructive electrical treeing for each carrier may be reduced increasing the voltage endurance of the composites. Likewise, in dielectric material 10, there may be a region with enhanced local conductivity that provides a mechanism for redistributing charge around the particle around each of the smaller, first nanoparticles 14. In dielectric material 10, the effect may be to increase voltage endurance, and may also be to improve dielectric breakdown strength since the electric fields may be made more homogeneous, as illustrated in FIG. 4.

Figure 5:
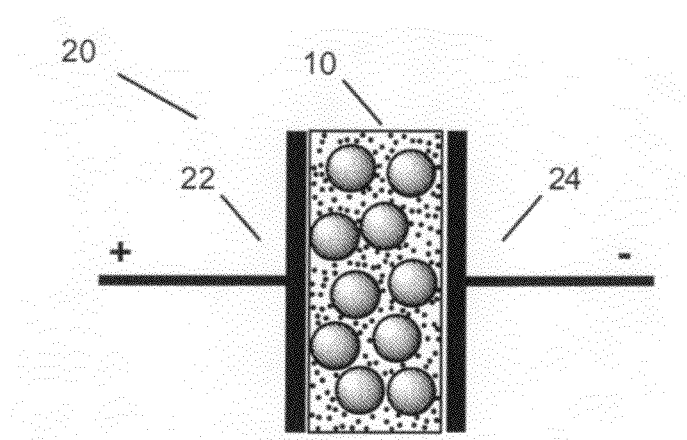
FIG. 5 illustrates an electrostatic capacitor, where first and second electrodes may be separated by an example dielectric material disclosed herein.

FIG. 5 illustrates an electrostatic capacitor, where first and second electrodes may be separated by a dielectric material 10, arranged in accordance with at least some embodiments described herein. As illustrated in FIG. 5, an electrostatic capacitor 20 may include first and second electrodes 22 and 24 separated by a dielectric material 10. The example dielectric material 10 (also illustrated in FIG. 3) may include a polymer 12, and a distribution of first nanoparticles 14, where the first nanoparticles 14 may include one of a semiconductor or insulator. The example dielectric material 10 may also include a distribution of second nanoparticles 16, where the second nanoparticles 16 may be larger in average diameter (i.e., a second average diameter) compared to the average diameter (i.e., a first average diameter) of the first nanoparticles 14. Also, the second nanoparticles 16 may have a bulk dielectric constant κ greater than about 10. Regarding the first nanoparticle, the most important consideration is its effect in suppressing dielectric breakdown. In various examples, the first nanoparticle may optionally have a dielectric constant κ greater than about 10.

Example embodiments may also include methods of making a dielectric material as described herein. These methods may be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each may be only with a machine that performs a portion of the program. In other examples, the human interaction may be automated such as by pre-selected criteria that are machine automated.

Figure 6:
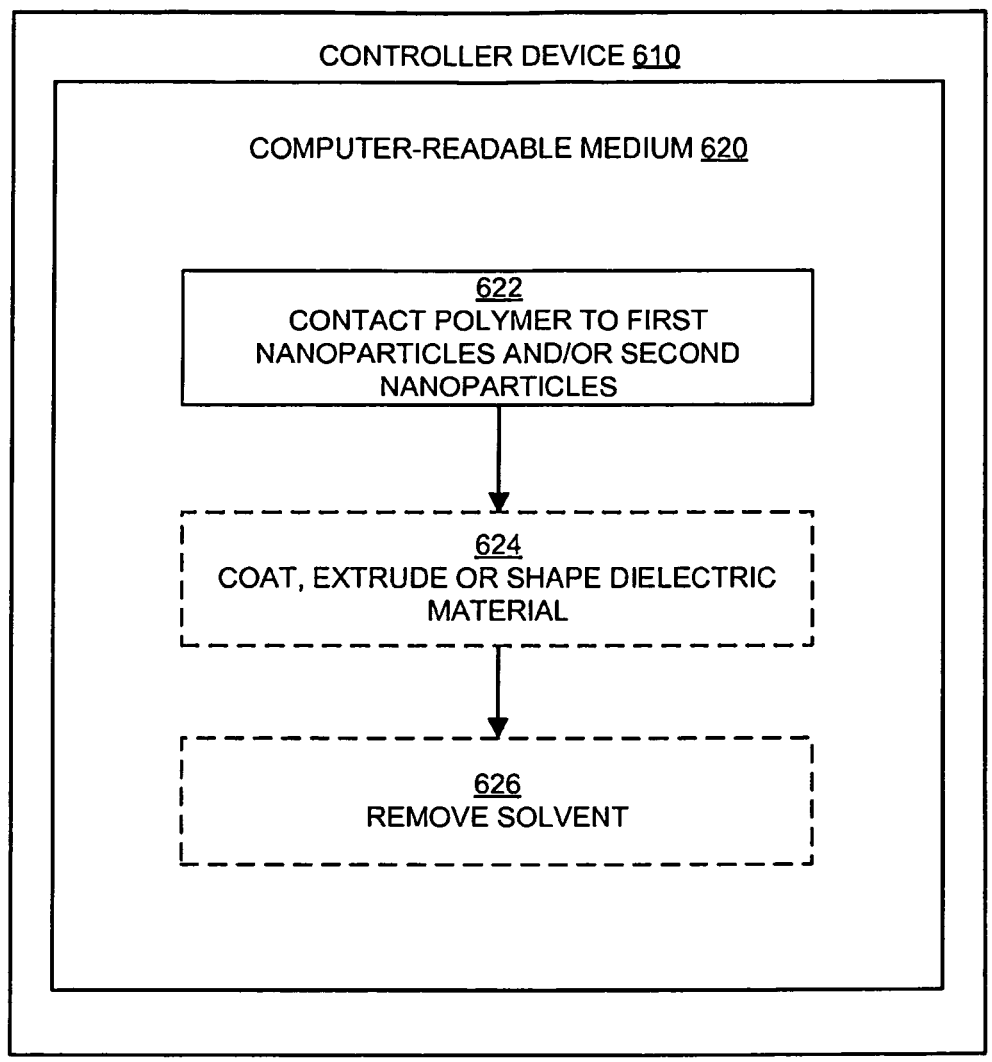
FIG. 6 is a flow diagram showing steps that may be used in making an example dielectric material as disclosed herein.

FIG. 6 is a flow diagram showing steps that may be used in making an example dielectric material 10, in accordance with at least some embodiments described herein. In various examples, a method of making a dielectric material 10 may include a step of contacting a distribution of first nanoparticles 14 with a polymer 12, where the first nanoparticles have a first average diameter, and the first nanoparticles 14 may include one of a semiconductor or insulator. The method of making the dielectric material 10 may also include contacting the polymer 12 to a distribution of second nanoparticles 16, where the second nanoparticles 16 have a second average diameter that may be larger than the first average diameter of the first nanoparticles 14. The second nanoparticles 16 may have a bulk dielectric constant κ greater than about 10.

Suitable polymer processing methods for forming the dielectric material include any suitable methods for forming the polymer in question in the absence of the nanoparticles. Such methods may include one or more techniques such as: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; or the like. Specific details of suitable polymer processing conditions may be selected based on the particular polymer chosen to make the dielectric material. For example, a solution casting method may employ high boiling solvents of the polymer in question. As an example of polymer processing, see the description in the following paragraph. One additional consideration for making the dielectric material may include various mixing techniques for dispersing the first and second nanoparticles in the polymer. The nanoparticles may be dispersed in a solution or liquid of the polymer or a polymer precursor. The dispersal methods may include mechanical techniques, for example, stirring or mechanical ball milling the nanoparticles in combination with the polymer. The dispersal methods may also include, for example, ultrasonication of the nanoparticles in contact with the polymer. In various examples, the dispersal method (e.g., ultrasonication) is followed immediately by the polymer forming method (e.g., spin coating) to avoid settling of the dispersed particles. The nanoparticles may be aided in dispersal by providing an organic surface layer coating. The organic surface layer coating may improve interactions between the nanoparticles and the polymer to permit better dispersal of the nanoparticles in the polymer.

A specific example of polymer processing and nanoparticle dispersal follows below. A solution of poly(vinylidene fluoride-co-hexafluoropropylene) P(VDF-HFP) may be formed by dissolution in the solvent dimethyl formamide (DMF) at a concentration of 1 gram P(VDF-HFP) in 50 milliliters DMF. The P(VDF-HFP) solution may be combined with 13 grams of pentafluorobenzyl phosphonic acid (PFBPA)-coated barium titanate particles. Barium titanate particles may be pre-coated with PFBPA by dissolving 0.2 millimoles of PFBPA in 1 milliliter of DMF, which may be added to a pre-dispersed barium titanate nanoparticle solution in DMF (0.4 grams/10 milliliters). The mixture may then be ultrasonicated for 10 minutes and stirred at 80° C. for 1 hour. The nanoparticles may be separated by using centrifugation and rinsed repeatedly with excess ethanol by using ultrasonication at 30-40° C. for 1 hour followed by centrifugation. After washing, the nanoparticles may be dried overnight under vacuum at 80° C. The PFBPA may be synthesized by the Arbuzov reaction of pentafluorobenzyl chloride (Sigma-Aldrich, St. Louis, Mo.) with, e.g., triethyl phosphate (Mallinckrodt Baker, Phillipsburg N.J.) followed by hydrolysis to form PFBPA. The P(VDF-HFP) solution may also be combined with 250 milligrams of 10-15 nanometer silica particles that have been surface pre-treated with FOTS (perfluorooctyltrimethoxysilane, Gelest, Tullytown, Pa.). The combined mixture (P(VDF-HFP) solution, PFBPA-barium titanate particles, and FOTS-silica particles) may be ultrasonicated for 60 minutes at 30° C. to disperse the particles. After dispersion, the resulting dispersed combined mixture may be formed into a thin layer by spin coating on a glass substrate at 30° C., 40%±5% relative humidity, and atmospheric pressure. The thin layer may be baked 1 minute at 150° C. to evaporate the DMF to produce the dielectric material as a thin film. The above described method is one example implementation. Embodiments are not limited to the materials, quantities, or approaches described above.

Figure 7:
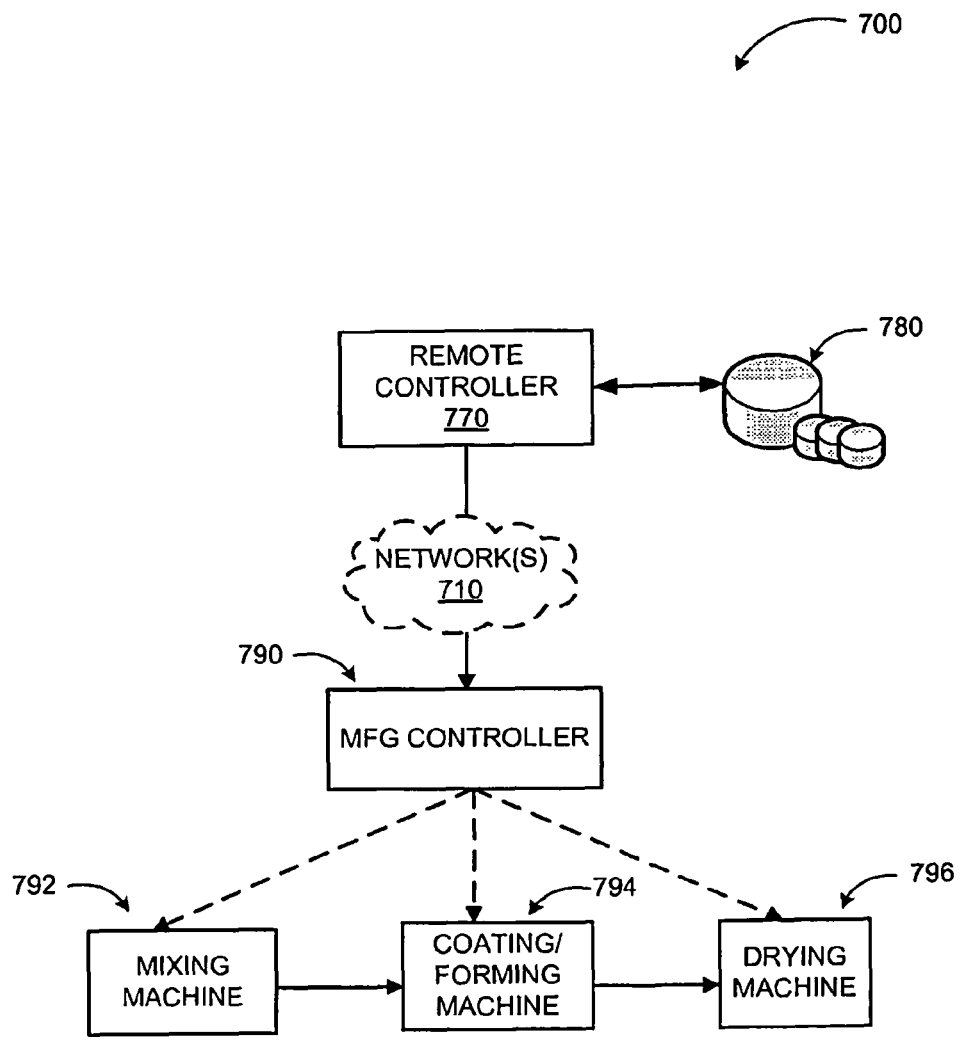
FIG. 7 is a block diagram of an automated machine that may be used for making an example dielectric material using the process steps outlined in FIG. 6.
Figure 8:
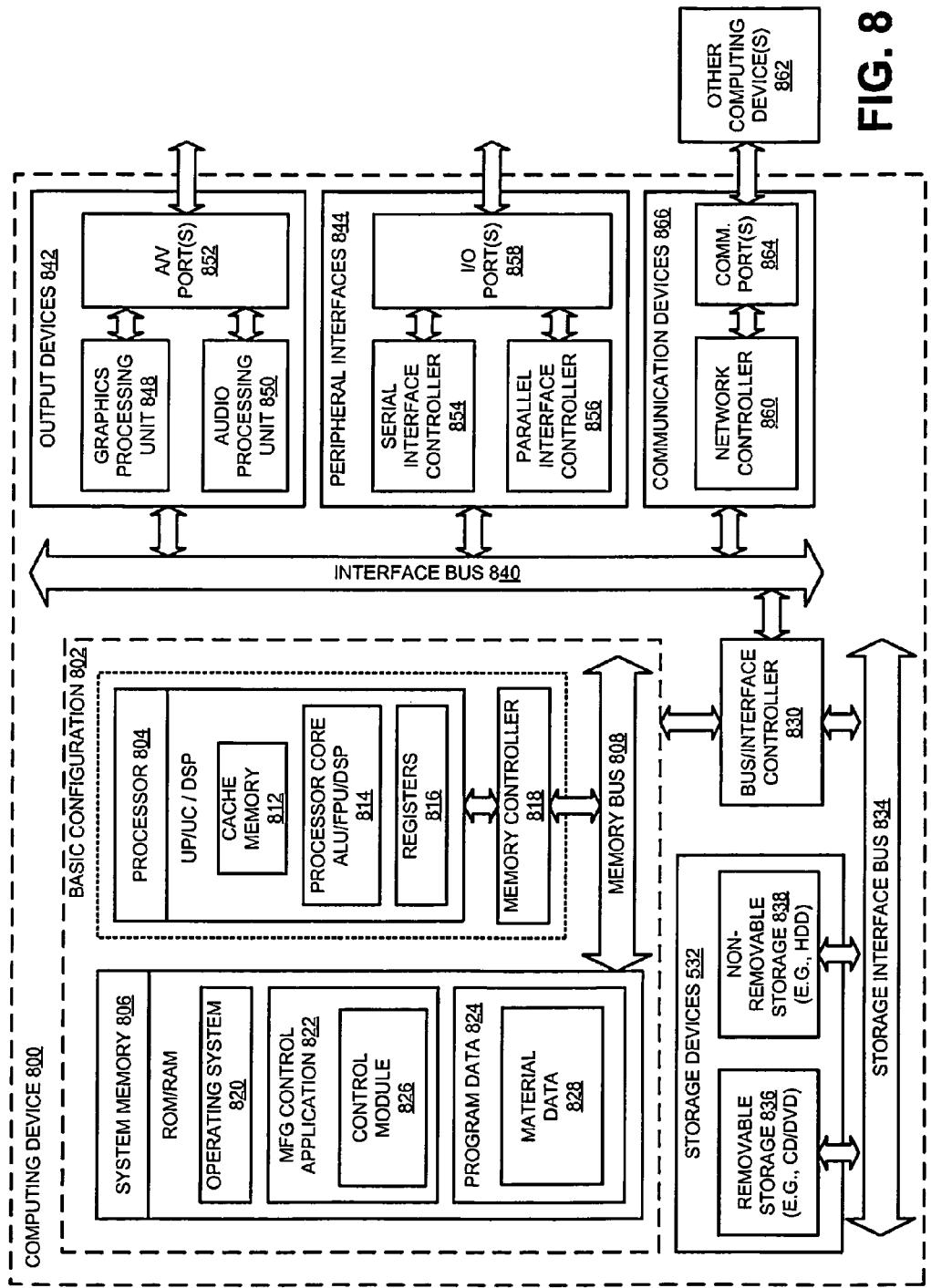
FIG. 8 illustrates a general purpose computing device that may be used to control the automated machine of FIG. 7 or similar manufacturing equipment in making an example dielectric material as disclosed herein.

In particular, FIG. 6 illustrates an example method of making dielectric material 10 that may be controlled by a computing device such as device 800 in FIG. 8 or a special purpose controller such as manufacturing controller 790 of FIG. 7. Thus, controller device 610 may be embodied as computing device 800, manufacturing controller 790, or similar devices executing instructions stored in computer-readable medium 620 for controlling the performance of the method. A process of making dielectric material 10 may include one or more operations, functions or actions as is illustrated by one or more of blocks 622, 624, and/or 626.

Some example processes may begin with operation 622, "CONTACT POLYMER 12 TO FIRST NANOPARTICLES 14 AND/OR SECOND NANOPARTICLES 16". Operation 622 may be performed, for example, by mixing machine 792 of FIG. 7. Mixing machine 792 may include one or more mixing functions, such as mechanical stirring, ultrasonication for dispersing the nanoparticles as described above, or the like. At operation 622, manufacturing controller 790 may instruct mixing machine 792 with parameters regarding, for example, the extent of mechanical stirring or ultrasonication by elapsed time for the polymer 12 and nanoparticles 14 and/or 16 being mixed. Operation 622 may be continued until a desired point is reached, e.g., the mixing has proceeded for a sufficient length of time to disperse the nanoparticles 14 and/or 16 in polymer 12. In various examples, mixing of polymer 12 and nanoparticles 14 and/or 16 may include ultrasonication between about 5 minutes and about 12 hours. In some examples, suitable ultrasonication times range from about 15 minutes to about 8 hours, between about 30 minutes to about 4 hours, or in some examples, about 2 hours. Suitable temperatures for mixing, including mechanical stirring or ultrasonication, are between about 0° C. and about 120° C., or in some examples between about 20° C. and about 100° C., between about 30° C. and about 90° C., between about 40° C. and about 80° C., between about 50° C. and about 70° C., or in some examples, about 60° C.

Operation 622 may be followed by optional operation 624, "COAT, EXTRUDE OR SHAPE DIELECTRIC MATERIAL 10". At operation 624, the processor (e.g. processor 610) may control a coating or forming machine such as coating/forming machine 794 of FIG. 7. Suitable coating techniques may include one or more of: melt processing; solvent evaporation; reduced pressure solvent evaporation; spin coating; dip coating; spray coating; solvent casting; doctor blading; removal of solvent under supercritical conditions; polymerization in situ from precursors of the polymer; curing or crosslinking the polymer in situ; or the like. In some examples, if polymer 12 and nanoparticles 14 and/or 16 are together in a solvent mixture, operation 624 may direct machine 794 to coat the solvent mixture on a surface, e.g., by spin coating, dip coating, spray coating, and so on, depending on the coating functionality of machine 794. In other examples, if polymer 12 is in a liquid state, e.g., via melting, or if polymer 12 is mixed together with nanoparticles 14 and/or 16 as a solid solution, coating/forming machine 794 may form a layer or article of dielectric material 10, e.g. by extrusion or injection molding, depending on the extrusion or molding functionality of coating/forming machine 794.

In some examples, if polymer 12 and nanoparticles 14 and/or 16 are together in a solvent mixture, operation 624 may be followed by optional operation 626, "REMOVE SOLVENT". At operation 626, the coating of polymer 12 and nanoparticles 14 and/or 16, if coated as a solvent mixture, may be treated by drying machine 796 to remove the solvent, e.g., by heating, reduced pressure, and so on as described above.

The operations included in the process of FIG. 6 described above are for illustration purposes. A process of making an example dielectric material 10 may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 7 is a block diagram of an automated machine 700 that may be used for making an example dielectric material as described herein using the process steps outlined in FIG. 6, in accordance with at least some embodiments. As illustrated in FIG. 7, a manufacturing controller 790 may be coupled to machines that may be used to carry out the steps described in FIG. 6, for example, a mixing machine 792, a coating/forming machine 794, and/or a drying machine 796. Manufacturing controller 790 may be operated by human control, or may be directed by a remote controller 770 via network 710. Data associated with controlling the different processes of making the dielectric material may be stored at and/or received from data stores 780.

Following are three narrations of example methods of making dielectric material 10, using the machines and steps described above for FIGS. 6 and 7.

In some examples, the method may be implemented by contacting at least one of the first and the second nanoparticles 14 and 16 with a solution of polymer 12 in an organic solvent; and removing the organic solvent. Suitable solvents may vary depending on the polymer to be dissolved, but may include, for example, halogenated solvents such as chloroform, dichloromethane, carbon tetrachloride, trichloroethylene, chlorofluorocarbons, and the like; ethereal solvents such as tetrahydrofuran, dioxane, diethyl ether, and the like; polar organic solvents, such as dimethyl formamide, dimethyl sulfoxide, n-methylpyrrolidone, hexamethyl phosphoramide, nitromethane, nitrobenzene, and the like; aromatic solvents, such as benzene, toluene, xylenes, and the like; hydrophobic alkyl solvents such as hexane, heptanes, octane, and the like; combinations of two or more solvents; and so on. The solution of polymer in the organic solvent may be combined with the nanoparticles, and the mixture may be formed into a material by spin coating, dip coating, and so on. The solvent may be removed by evaporation, either unassisted or with heating, reduced pressure, a flow of air or other gas, etc. In some examples, the method may be implemented by contacting at least one of the first and the second nanoparticles 14 and 16 with polymer 12 in its molten state. In some examples, polymer 12 may be polyvinylidene difluoride, which may be heated past its melting point (177 C) and combined with first nanoparticles 14 (which may be silicon dioxide nanoparticles; 5-10 nanometer average diameter; precoated with a layer of n-octyl phosphonate; used in an amount to result in 5-10% by volume of the final material) and second nanoparticles 16 (which may be barium titanate nanoparticles; 75 nanometer average diameter; in an amount to result in 65% by volume of the final material). The mixture may be mixed using mixing machine 792 (e.g., configured as a heated twin screw extruder to accomplish mixing of the polymer and the nanoparticles). The resulting molten nanocomposite may be formed into thin sheets by machine 796 (e.g., configured as a roller), cooled, and may then be characterized for dielectric strength and voltage endurance.

In various examples, polymer 12 may be polyvinylidene difluoride, which may be dissolved, with heating, in a mixture of tetrahydrofuran and dimethyl formamide, and may then be combined with first nanoparticles 14 (which may be silicon dioxide nanoparticles; 5-10 nanometer average diameter; precoated with a layer of n-octyl phosphonate; used in an amount to result in 5-10% by volume of the final material) and second nanoparticles 16 (which may be barium titanate nanoparticles; 75 nanometer average diameter; in an amount to result in 65% by volume of the final material). The preceding polymer 12 and nanoparticles 14 and 16 may be combined in a single solvent mixture and mixed using mixing machine 792 (e.g., configured as a mechanically stirred vessel). The resulting solvent mixture may be coated as a thin film onto a polytetrafluoroethylene substrate by coating/forming machine 794 (e.g., configured as a spin coater), the solvent removed by drying machine 796 (configured as a heated, reduced pressure drying oven) cooled, and may then be characterized for dielectric strength and voltage endurance.

In other examples, the method may be implemented by contacting at least one of the first and the second nanoparticles 14 and 16 with a precursor of polymer 12; and polymerizing the precursor to form the polymer. Thus, in other examples, a porous cake may be formed from first nanoparticles 14 (which may be silicon dioxide nanoparticles; 5-10 nanometer average diameter; precoated with a layer of n-octyl phosphonate; used in an amount to result in 5-10% by volume of the final material) and second nanoparticles 16 (which may be barium titanate nanoparticles; 75 nanometer average diameter; in an amount to result in 65% by volume of the final material), and also may include a catalytic amount of a radical initiator such as azobisisobutyronitrile (AlBN). Gaseous vinylidene difluoride may be infused into the porous cake under pressure with heating to activate the radical initiator by mixing machine 792 (configured as a pressure reactor), and the vinylidene difluoride may be allowed to polymerize to fill the voids of the particle cake. A thin sheet may be cleaved from the resulting solid by coating/forming machine 794 (configured as a microtome) and then characterized for dielectric strength and voltage endurance.

FIG. 8 illustrates a general purpose computing device that may be used to control the automated machine 700 of FIG. 7 or similar manufacturing equipment in making an example dielectric material 10, in accordance with at least some embodiments described herein. In a basic configuration 802, computing device 800 may include one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level cache memory 812, a processor core 814, and registers 816. Example processor core 814 may include an arithmetic logic unit (ALU), a floating point unit (FPU), a digital signal processing core (DSP Core), or any combination thereof. An example memory controller 818 may also be used with processor 804, or in some implementations memory controller 815 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more manufacturing control applications 822, and program data 824. Manufacturing control application 822 may include a control module 826 that is arranged to control automated machine 700 of FIG. 7 and any other processes, methods and functions as discussed above. Program data 824 may include, among other data, material data 828 for controlling various aspects of the automated machine 700. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 866 to basic configuration 802 via bus/interface controller 830. Example output devices 842 include a graphics processing unit 848 and an audio processing unit 850, which may be configured to communicate to various external devices such as a display or speakers via one or more NV ports 852. Example peripheral interfaces 544 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 includes a network controller 860, which may be arranged to facilitate communications with one or more other computing devices 862 over a network communication link via one or more communication ports 864.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a physical server, virtual server, a computing cloud, or a hybrid device that include any of the above functions. Computing device 800 may also be implemented as a personal computer including both laptop computer and non-laptop computer configurations. Moreover computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

The present disclosure generally describes compositions for nanocomposite dielectrics. An example dielectric material may include a polymer, and a distribution of first nanoparticles, where the first nanoparticles have a first average diameter and the first nanoparticles may include one of a semiconductor or insulator. The example dielectric material may also include a distribution of second nanoparticles that has a second average diameter that is larger than the first average diameter, and the second nanoparticles may have a bulk dielectric constant κ greater than about 10.

According to some examples, polymer 12 may have a dielectric strength greater than about 10 megavolts per meter. In various examples, polymer 12 may have a dielectric strength greater than about 15, 20, 25, 30, 35, 40, 45, 50, 55, 60, 65, or 70 megavolts per meter.

According to various examples, polymer 12 may include one or more of an epoxy, a polyolefin, polyvinylidene difluoride, polyvinylidene difluoride-hexafluoropropylene, and/or a polytetrafluoroethylene. In some examples, the polymer may include one or more fluorinated polymers, e.g., polyvinylidene difluoride, polyvinylidene difluoride-hexafluoropropylene, and/or a polytetrafluoroethylene.

According to various examples, first nanoparticles 14 may include an insulator or a semiconductor. Examples of suitable materials for first nanoparticles 14 may include one or more of silicon dioxide, alumina, ceria, and/or zirconia.

According to other examples, second nanoparticles 16 may have a bulk dielectric constant κ greater than about 10. In some examples, second nanoparticles 16 may have a bulk dielectric constant κ greater than about 25, 50, 75, 100, 200, 300, 400, 500, 1,000, 5,000, or 10,000.

In various examples, second nanoparticles 16 may include one or more of barium titanate, barium strontium titanate, strontium titanate, titanium dioxide, lead zirconate titanate, and/or hafnium oxide.

In further examples, either or both of first or second nanoparticles 14 or 16 may include an organic surface layer. In some examples, either or both of first or second nanoparticles 14 or 16 may include an organic surface monolayer or an organic surface multilayer.

In various examples, the organic surface layer may include an alkyl phosphonate, an alkyl carboxylate, an alkylsiloxane, or a crosslinking agent. In some examples, the organic surface layer may be an n-octyl phosphonic acid layer. In further examples, the organic surface layer may be a vinyl silane crosslinking agent.

In some examples, the second average diameter of the distribution of second nanoparticles 16 may be between about 2 to about 100 times larger than the first average diameter of the distribution of first nanoparticles 14. In some examples, the second average diameter of second nanoparticles 16 may be between about 5 to about 50 times, between about 10 to about 25 times, between about 10 to about 20 times, or about 10 times larger than the first average diameter of first nanoparticles 14.

In various examples, the second average diameter of the distribution of the second nanoparticles may be between about 25 nanometers and about 200 nanometers. In further examples, the second average diameter of the distribution of second nanoparticles 16 may be between about 10 nanometers and about 500 nanometers, between about 25 nanometers and about 200 nanometers, between about 35 nanometers and about 150 nanometers, or between about 50 nanometers and about 100 nanometers.

In other examples, the first average diameter of the distribution of first nanoparticles 14 may be less than about 25 nanometers. In further examples, the first average diameter of the distribution of first nanoparticles 14 can be between about 1 nanometer and about 20 nanometers, between about 5 nanometers and about 15 nanometers, or between about 5 nanometers and about 10 nanometers.

In further examples, the distribution of the second nanoparticles 16 may be between about 40% and about 70% of the dielectric material 10 by volume. In other examples, the distribution of second nanoparticles 16 may be between about 20% and about 70%, between about 40% and about 70%, or between about 50% and about 65% of the dielectric material 10 by volume.

In some examples, the distribution of first nanoparticles 14 may be between about 1% and about 30% of the dielectric material 10 by volume. In further embodiments, the distribution of first nanoparticles 14 may be between about 2% and about 25%, between about 5% and about 20%, between about 5% and about 15%, or between about 5% and about 10% of the dielectric material 10 by volume. In various examples, the distribution of first nanoparticles 14 may be between about 5% and about 10% of the dielectric material 10 by volume, and the distribution of first nanoparticles 14 may be between about 5 nanometers and about 10 nanometers in average diameter.

The present disclosure also describes capacitors employing nanocomposite dielectrics. In other examples, a capacitor may include a first electrode, a second electrode, and a dielectric material that separates the first and second electrodes. The dielectric material may include a polymer, and a distribution of first nanoparticles, the first nanoparticles having a first average diameter, where the first nanoparticles may include one of a semiconductor or insulator. The dielectric material in the capacitor may also include a distribution of second nanoparticles that has a second average diameter that is larger than the first average diameter, and the second nanoparticles may have a bulk dielectric constant κ greater than about 10.

According to some examples of capacitor 20, polymer 12 may have a dielectric strength greater than about 10 megavolts per meter. In various examples, polymer 12 may have a dielectric strength greater than about 15, 20, 25, 30, 35, 40, 45, 50, 55, 60, 65, or 70 megavolts per meter.

According to various examples of capacitor 20, polymer 12 may include one or more of an epoxy, a polyolefin, polyvinylidene difluoride, polyvinylidene difluoride-hexafluoropropylene, and/or a polytetrafluoroethylene. In some examples, the polymer may include one or more fluorinated polymers, e.g., polyvinylidene difluoride, polyvinylidene difluoride-hexafluoropropylene, and/or a polytetrafluoroethylene.

According to various examples of capacitor 20, first nanoparticles 14 may include an insulator or a semiconductor. Examples of suitable materials for first nanoparticles 14 may include one or more of silicon dioxide, alumina, ceria, and/or zirconia.

According to other examples of capacitor 20, second nanoparticles 16 may have a bulk dielectric constant κ greater than about 10. In some examples, second nanoparticles 16 may have a bulk dielectric constant κ greater than about 25, 50, 75, 100, 200, 300, 400, 500, 1,000, 5,000, or 10,000.

In various examples of capacitor 20, second nanoparticles 16 may include one or more of barium titanate, barium strontium titanate, strontium titanate, titanium dioxide, lead zirconate titanate, and/or hafnium oxide.

In further examples of capacitor 20, either or both of first or second nanoparticles 14 or 16 may include an organic surface layer. In some examples, either or both of first or second nanoparticles 14 or 16 may include an organic surface monolayer or an organic surface multilayer.

In various examples of capacitor 20, the organic surface layer may include an alkyl phosphonate, an alkyl carboxylate, an alkylsiloxane, or a crosslinking agent. In some examples, the organic surface layer may be an n-octyl phosphonic acid layer. In further examples, the organic surface layer may be a vinyl silane crosslinking agent.

In some examples of capacitor 20, the second average diameter of the distribution of second nanoparticles 16 may be between about 2 to about 100 times larger compared to the first average diameter of the distribution of first nanoparticles 14. In some examples, the second average diameter of second nanoparticles 16 may be between about 5 to about 50 times, between about 10 to about 25 times, between about 10 to about 20 times, or about 10 times larger than the first average diameter of first nanoparticles 14.

In various examples of capacitor 20, the second average diameter of the distribution of the second nanoparticles may be between about 25 nanometers and about 200 nanometers. In further examples, the second average diameter of the distribution of second nanoparticles 16 may be between about 10 nanometers and about 500 nanometers, between about 25 nanometers and about 200 nanometers, between about 35 nanometers and about 150 nanometers, or between about 50 nanometers and about 100 nanometers.

In other examples of capacitor 20, the first average diameter of the distribution of first nanoparticles 14 may be less than about 25 nanometers. In further examples, the first average diameter of the distribution of first nanoparticles 14 can be between about 1 nanometer and about 20 nanometers, between about 5 nanometers and about 15 nanometers, or between about 5 nanometers and about 10 nanometers.

In further examples of capacitor 20, the distribution of the second nanoparticles 16 may be between about 40% and about 70% of the dielectric material 10 by volume. In other examples, the distribution of second nanoparticles 16 may be between about 20% and about 70%, between about 40% and about 70%, or between about 50% and about 65% of the dielectric material 10 by volume.

In some examples of capacitor 20, the distribution of first nanoparticles 14 may be between about 1% and about 30% of the dielectric material 10 by volume. In further embodiments, the distribution of first nanoparticles 14 may be between about 2% and about 25%, between about 5% and about 20%, between about 5% and about 15%, or between about 5% and about 10% of the dielectric material 10 by volume. In various examples, the distribution of first nanoparticles 14 may be between about 5% and about 10% of the dielectric material 10 by volume, and the distribution of first nanoparticles 14 may be between about 5 nanometers and about 10 nanometers in average diameter.

In further examples, a method of making a dielectric material 10 may include a step 622 of contacting a distribution of first nanoparticles 14 with a polymer 12, the first nanoparticles 14 having a first average diameter, where the first nanoparticles 14 may include one of a semiconductor or insulator. The method of making the dielectric material 10 may also include contacting the polymer 12 to a distribution of second nanoparticles 16 that has a second average diameter that is larger than the first average diameter, and the second nanoparticles 16 may have a bulk dielectric constant κ greater than about 10.

According to some examples of a method of making a dielectric material 10, polymer 12 may have a dielectric strength greater than about 10 megavolts per meter. In various examples, polymer 12 may have a dielectric strength greater than about 15, 20, 25, 30, 35, 40, 45, 50, 55, 60, 65, or 70 megavolts per meter.

According to various examples of a method of making a dielectric material 10, polymer 12 may include one or more of an epoxy, a polyolefin, polyvinylidene difluoride, polyvinylidene difluoride-hexafluoropropylene, and/or a polytetrafluoroethylene. In some examples, the polymer may include one or more fluorinated polymers, e.g., polyvinylidene difluoride, polyvinylidene difluoride-hexafluoropropylene, and/or a polytetrafluoroethylene.

According to various examples of a method of making a dielectric material 10, first nanoparticles 14 may include an insulator or a semiconductor. Examples of suitable materials for first nanoparticles 14 may include one or more of silicon dioxide, alumina, ceria, and/or zirconia.

According to other examples of a method of making a dielectric material 10, second nanoparticles 16 may have a bulk dielectric constant κ greater than about 10. In some examples, second nanoparticles 16 may have a bulk dielectric constant κ greater than about 25, 50, 75, 100, 200, 300, 400, 500, 1,000, 5,000, or 10,000.

In various examples of a method of making a dielectric material 10, second nanoparticles 16 may include one or more of barium titanate, barium strontium titanate, strontium titanate, titanium dioxide, lead zirconate titanate, and/or hafnium oxide.

In further examples of a method of making a dielectric material 10, either or both of first or second nanoparticles 14 or 16 may include an organic surface layer. In some examples, either or both of first or second nanoparticles 14 or 16 may include an organic surface monolayer or an organic surface multilayer. In various examples of a method of making a dielectric material 10, the method may include a step of applying an organic surface layer to either or both of first or second nanoparticles 14 or 16.

In various examples of a method of making a dielectric material 10, the organic surface layer may include an alkyl phosphonate, an alkyl carboxylate, an alkylsiloxane, or a crosslinking agent. In some examples, the organic surface layer may be an n-octyl phosphonic acid layer. In further examples, the organic surface layer may be a vinyl silane crosslinking agent.

In some examples of a method of making a dielectric material 10, the second average diameter of the distribution of second nanoparticles 16 may be between about 2 to about 100 times larger than the first average diameter of the distribution of first nanoparticles 14. In some examples, the second average diameter of second nanoparticles 16 may be between about 5 to about 50 times, between about 10 to about 25 times, between about 10 to about 20 times, or about 10 times larger than the first average diameter of first nanoparticles 14.

In various examples of a method of making a dielectric material 10, the second average diameter of the distribution of the second nanoparticles may be between about 25 nanometers and about 200 nanometers. In further examples, the second average diameter of the distribution of second nanoparticles 16 may be between about 10 nanometers and about 500 nanometers, between about 25 nanometers and about 200 nanometers, between about 35 nanometers and about 150 nanometers, or between about 50 nanometers and about 100 nanometers.

In other examples of a method of making a dielectric material 10, the first average diameter of the distribution of first nanoparticles 14 may be less than about 25 nanometers. In further examples, the first average diameter of the distribution of first nanoparticles 14 can be between about 1 nanometer and about 20 nanometers, between about 5 nanometers and about 15 nanometers, or between about 5 nanometers and about 10 nanometers.

In further examples of a method of making a dielectric material 10, the distribution of the second nanoparticles 16 may be between about 40% and about 70% of the dielectric material 10 by volume. In other examples, the distribution of second nanoparticles 16 may be between about 20% and about 70%, between about 40% and about 70%, or between about 50% and about 65% of the dielectric material 10 by volume.

In some examples of a method of making a dielectric material 10, the distribution of first nanoparticles 14 may be between about 1% and about 30% of the dielectric material 10 by volume. In further embodiments, the distribution of first nanoparticles 14 may be between about 2% and about 25%, between about 5% and about 20%, between about 5% and about 15%, or between about 5% and about 10% of the dielectric material 10 by volume. In various examples, the distribution of first nanoparticles 14 may be between about 5% and about 10% of the dielectric material 10 by volume, and the distribution of first nanoparticles 14 may be between about 5 nanometers and about 10 nanometers in average diameter.

As used herein, dielectric constant $\kappa$ means the relative static electric permittivity of a material at zero frequency, compared to that of vacuum: $\kappa = \in(0)/\in_0$ (where $\in_0$ represents the electric constant of a vacuum). Commonly reported low $\kappa$ values include, e.g., vacuum ($\kappa=1$), air ($\kappa \approx 1$), polytetrafluoroethylene ($\kappa=2.1$), polyethylene ($\kappa=2.25$), and silicon dioxide ($\kappa=3.9$). As used herein, "high-$\kappa$" materials have a $\kappa$ of 10 or higher; commonly reported values include, e.g., silicon ($\kappa=11.68$), hafnium oxide ($\kappa=25$), titanium dioxide ($\kappa=86$ to 173), strontium titanate ($\kappa=310$), barium strontium titanate ($\kappa=500$), barium titanate ($\kappa=1,250$ to $10,000$), and lead zirconate titanate ($\kappa=500$ to $6000$).

As used herein, "dielectric strength" means the electric field strength a material may withstand without breaking down and losing its insulating properties. Dielectric strength may be expressed as field strength per length, e.g., megavolts per meter.

As used herein, a "nanoparticle" means a particle which in average diameter may be less than about 1 micron in average diameter, for example, between about 1 nanometer and about 1 micron in average diameter; or in some examples, having an average diameter between about 1 nanometer and about 500 nanometers in size.

The terms "a" and "an" as used herein mean "one or more" unless the singular is expressly specified. Thus, for example, reference to "a base" includes a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

The terms "optional" and "optionally" mean that the subsequently described circumstance may or may not occur, so that the description includes instances where the circumstance occurs and instances where it does not.

Alkyl groups include straight chain and branched chain alkyl groups having from 1 to 12 carbon atoms, in various examples from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

In various examples, either or both of first or second nanoparticles 14 or 16 may include an organic surface layer. In some examples, either or both of first or second nanoparticles 14 or 16 may include an organic surface monolayer or an organic surface multilayer. In various examples, the organic surface layer may include an alkyl phosphonate, an alkyl carboxylate, an alkylsiloxane, or a crosslinking agent. In some examples, the organic surface layer may be an n-octyl phosphonic acid layer. In further examples, the organic surface layer may be a vinyl silane crosslinking agent. Such organic surface layers may be used to increase chemical compatibility, miscibility, etc. when mixed into organic polymers, compared to particles without organic surface layers. In some examples, the method includes applying an organic surface layer to at least one of the first and second nanoparticles. Organic surface layers may be formed by a condensation reaction between OH groups on the layer-forming group and the surface. For example, an alkyl carboxylate, alkyl-C(=O)—OH, may be reacted, optionally via acidic or basic catalysis, with a free HO—Si group on the surface of a silica particle to release $H_2O$ and form alkyl-C(=O)—O—Si-(particle). Similarly, alkyl phosphonates and alkyl siloxanes may be reacted with free OH groups on the particle surfaces to form corresponding organic surface layers. In other examples, in the case of a crosslinking agent such as vinyl silane, the silane portion may be coupled to the particle surfaces, e.g., by a condensation reaction to form a vinyl-Si—O— group bonded to the nanoparticle surface; further, the polymer 12 may be crosslinked by the vinyl group (e.g., polymer 12 may be polyvinylidene difluoride), which may improve the mechanical strength and the high temperature breakdown endurance of the nanocomposite dielectric material 10.

The terms "alkyl phosphonate", "alkyl carboxylate", and "alkyl siloxane" refer to the corresponding groups bonded to an alkyl group, e.g., alkyl-P(=O)(OH)$_2$, alkyl-C(=O)OH, etc. In the context of an organic surface layer, the terms "alkyl phosphonate", "alkyl carboxylate", "alkyl siloxane" and "crosslinking agent" (e.g., a "vinyl silane") refer to these groups where available OH groups may be bonded to complementary surface groups, e.g., a silicon atom or other reactive site on the particles so modified. For example, an alkyl carboxylate organic surface layer on a silicon dioxide particle may be represented in part by alkyl-C(=O)—O—Si-particle.

The term "halogen" or "halo," as used herein, refers to bromine, chlorine, fluorine, or iodine. In some examples, the halogen may be fluorine. In other examples, the halogen may be chlorine or bromine.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which may, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a suitable data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A suitable manufacturing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A dielectric material, comprising:
   a polymer;
   a distribution of first nanoparticles, the first nanoparticles having a first average diameter, and the first nanoparticles including one or more of a semiconductor or insulator; and
   a distribution of second nanoparticles, the second nanoparticles having a second average diameter that is larger than the first average diameter, the second nanoparticles having a bulk dielectric constant κ greater than about 10, wherein the first or second nanoparticles include an organic surface layer and wherein the dielectric material separates a first electrode and a second electrode of a capacitor.

2. The dielectric material of claim 1, wherein the polymer is one or more of an epoxy, a polyolefin, polyvinylidene difluoride, polyvinylidene difluoride-hexafluoropropylene, and/or a polytetrafluoroethylene.

3. The dielectric material of claim 1, wherein the polymer has a dielectric strength greater than about 20 megavolts/meter.

4. The dielectric material of claim 1, wherein the first nanoparticles include one or more of silicon dioxide, alumina, ceria, and/or zirconia.

5. The dielectric material of claim 1, wherein the second nanoparticles have the bulk dielectric constant κ greater than about 100.

6. The dielectric material of claim 1, wherein the second nanoparticles include one or more of barium titanate, barium strontium titanate, strontium titanate, titanium dioxide, lead zirconate titanate, and/or hafnium oxide.

7. The dielectric material of claim 1, wherein the organic surface layer includes one of an alkyl phosphonate, an alkyl carboxylate, an alkylsiloxane, or a crosslinking agent.

8. The dielectric material of claim 1, wherein the organic surface layer is n-octyl phosphonic acid.

9. The dielectric material of claim 1, wherein the second average diameter of the distribution of the second nanoparticles is between about 2 to about 100 times larger than the first average diameter of the distribution of the first nanoparticles.

10. The dielectric material of claim 1, wherein the second average diameter is between about 25 nanometers and about 200 nanometers.

11. The dielectric material of claim 1, wherein the first average diameter is less than about 25 nanometers.

12. The dielectric material of claim 1, wherein the distribution of the second nanoparticles is between about 40% and about 70% of the dielectric material by volume.

13. The dielectric material of claim 12, wherein the distribution of the first nanoparticles are between about 1% and about 30% of the dielectric material by volume.

14. A capacitor, comprising:
   a first electrode;
   a second electrode;
   a dielectric material that separates the first and second electrodes, the dielectric material comprising:
      a polymer;
      a distribution of first nanoparticles, the first nanoparticles having a first average diameter, and the first nanoparticles including one of a semiconductor or insulator; and
      a distribution of second nanoparticles, the second nanoparticles having a second average diameter that is larger than the first average diameter, and the second nanoparticles having a bulk dielectric constant κ greater than about 10, wherein the first or second nanoparticles include an organic surface layer.

15. The capacitor of claim 14, wherein the polymer is one or more of an epoxy, a polyolefin, polyvinylidene difluoride, polyvinylidene difluoride-hexafluoropropylene, and/or a polytetrafluoroethylene.

16. The capacitor of claim 14, wherein the polymer has a dielectric strength greater than about 20 megavolts/meter.

17. The capacitor of claim 14, wherein the first nanoparticles include one or more of silicon dioxide, alumina, ceria, and/or zirconia.

18. The capacitor of claim 14, wherein the second nanoparticles have the bulk dielectric constant κ greater than about 100.

19. The capacitor of claim 14, wherein the second nanoparticles include one or more of barium titanate, barium strontium titanate, strontium titanate, titanium dioxide, lead zirconate titanate, and/or hafnium oxide.

20. The capacitor of claim 14, wherein the second average diameter of the distribution of the second nanoparticles is between about 2 to about 100 times larger than the first average diameter of the distribution of the first nanoparticles.

21. The capacitor of claim 14, wherein the second average diameter is between about 25 nanometers and about 200 nanometers.

22. The capacitor of claim 14, wherein the first average diameter is less than about 25 nanometers.

23. The capacitor of claim 14, wherein the distribution of the second nanoparticles is between about 40% and about 70% of the dielectric material by volume.

24. The capacitor of claim 14, wherein the distribution of the first nanoparticles are between about 1% and about 30% of the dielectric material by volume.

25. A method of making a dielectric material, comprising:
contacting a distribution of first nanoparticles with a polymer, the first nanoparticles having a first average diameter, and the first nanoparticles including one of a semiconductor or insulator;
contacting the polymer to a distribution of second nanoparticles, the second nanoparticles having a second average diameter that is larger than the first average diameter, the second nanoparticles having a bulk dielectric constant κ greater than about 10, wherein the first or second nanoparticles include an organic surface layer and wherein the dielectric material separates a first electrode and a second electrode of a capacitor.

26. The method of claim 25, further comprising:
contacting at least one of the first and the second nanoparticles with a solution of the polymer in an organic solvent; and
removing the organic solvent.

27. The method of claim 25, further comprising:
contacting at least one of the first and the second nanoparticles with a precursor of the polymer; and
polymerizing the precursor to form the polymer.

28. The method of claim 25, wherein the polymer is one or more of an epoxy, a polyolefin, polyvinylidene difluoride, polyvinylidene difluoride-hexafluoropropylene, and/or a polytetrafluoroethylene.

29. The method of claim 25, wherein the polymer has a dielectric strength greater than about 20 megavolts/meter.

30. The method of claim 25, wherein the first nanoparticles include one or more of silicon dioxide, alumina, ceria, and/or zirconia.

31. The method of claim 25, wherein the second nanoparticles have the bulk dielectric constant κ greater than about 100.

32. The method of claim 25, wherein the second nanoparticles include one or more of barium titanate, barium strontium titanate, strontium titanate, titanium dioxide, lead zirconate titanate, and/or hafnium oxide.

33. The method of claim 25, wherein the second average diameter of the distribution of the second nanoparticles is between about 2 to about 100 times larger than the first average diameter of the distribution of the first nanoparticles.

34. The method of claim 25, wherein the second average diameter is between about 25 nanometers and about 200.

35. The method of claim 25, wherein the first average diameter is less than about 25 nanometers.

36. The method of claim 25, wherein the distribution of the second nanoparticles is between about 40% and about 70% of the dielectric material by volume.

37. The method of claim 25, wherein the distribution of the first nanoparticles are between about 1% and about 30% of the dielectric material by volume.

38. The capacitor of claim 14, wherein both the first nanoparticles and the second nanoparticles each have an organic surface layer.

39. The capacitor of claim 14, wherein the first nanoparticles are distributed through the polymer so as to occupy spaces between the second nanoparticles.

40. A capacitor, comprising:
a first electrode;
a second electrode;
a dielectric material that separates the first and second electrodes, the dielectric material comprising:
a polymer;
a distribution of first nanoparticles, the first nanoparticles having a first average diameter, and the first nanoparticles including one of a semiconductor or insulator; and
a distribution of second nanoparticles, the second nanoparticles having a second average diameter that is larger than the first average diameter, and the second nanoparticles having a bulk dielectric constant κ greater than about 10, wherein the second nanoparticles include one or more of nanoparticles selected from a group of nanoparticles consisting of silicon dioxide, alumina, ceria, and zirconia.

41. A capacitor, comprising:
a first electrode;
a second electrode;
a dielectric material that separates the first and second electrodes, the dielectric material comprising:
a polymer;
a distribution of first nanoparticles, the first nanoparticles having a first average diameter, and the first nanoparticles including one of a semiconductor or insulator; and
a distribution of second nanoparticles, the second nanoparticles having a second average diameter that is larger than the first average diameter, and the second nanoparticles having a bulk dielectric constant κ greater than about 10, wherein the second average diameter is between about 25 nanometers and about 200 nanometers.

* * * * *

UNITED STATES PATENT AND TRADEMARK OFFICE
CERTIFICATE OF CORRECTION

| | | |
|---|---|---|
| PATENT NO. | : 8,785,521 B2 | Page 1 of 1 |
| APPLICATION NO. | : 13/143726 | |
| DATED | : July 22, 2014 | |
| INVENTOR(S) | : Miller et al. | |

It is certified that error appears in the above-identified patent and that said Letters Patent is hereby corrected as shown below:

On the Title Page, in Item (73), under "Assignee", in Column 1, Line 1, delete "Development," and insert -- Development --, therefor.

In the Drawings:

In Fig. 8, Sheet 8 of 8, delete Tag "532" and insert Tag -- 832 --, therefor.

In the Specification:

In Column 1, Lines 19-20, delete "processibility" and insert -- processability --, therefor.

In Column 1, Line 35, delete "use in in" and insert -- use in --, therefor.

In Column 2, Line 37, delete "nanoparticles; and" and insert -- nanoparticles; --, therefor.

In Column 9, Line 9, delete "(AlBN)." and insert -- (AIBN). --, therefor.

In Column 10, Line 24, delete "NV" and insert -- A/V --, therefor.

In Column 17, Line 39, delete "and or" and insert -- and/or --, therefor.

Signed and Sealed this
Thirty-first Day of March, 2015

Michelle K. Lee
*Director of the United States Patent and Trademark Office*